UNITED STATES PATENT OFFICE.

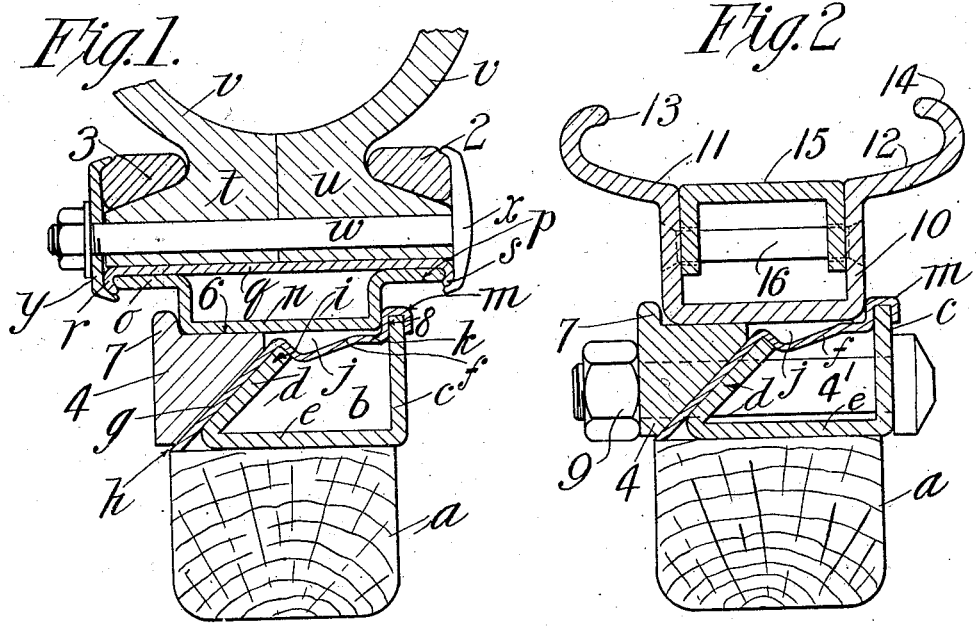
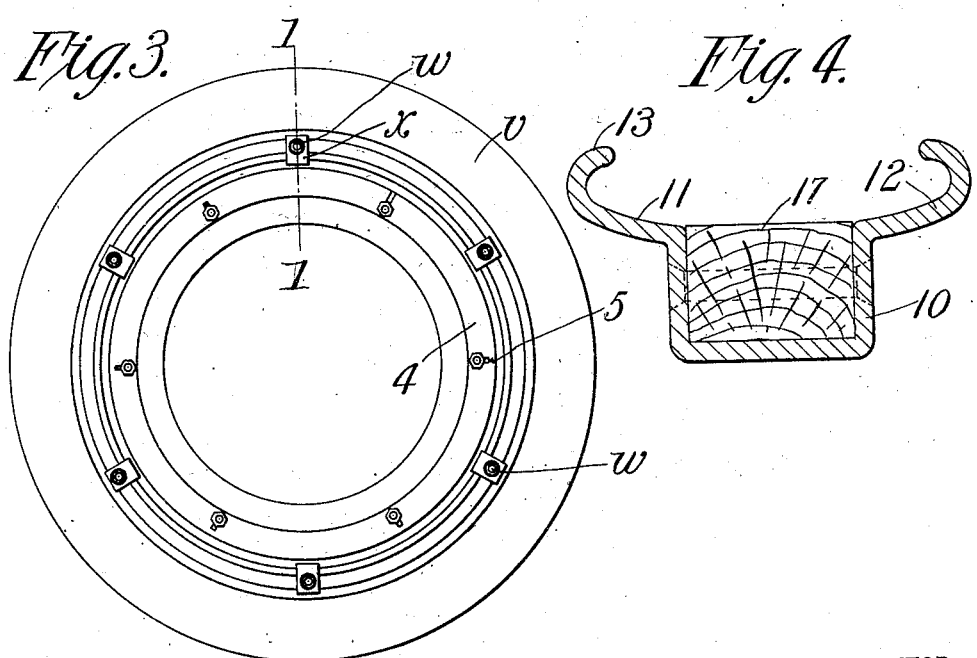

JOHN CLARENCE COLE, OF CHICOPEE FALLS, MASSACHUSETTS, ASSIGNOR, BY MESNE ASSIGNMENTS, TO THE FISK RUBBER COMPANY, OF CHICOPEE FALLS, MASSACHUSETTS, A CORPORATION OF DELAWARE.

REMOVABLE TUBULAR RIM.

994,247.   Specification of Letters Patent.   Patented June 6, 1911.

Application filed July 27, 1908. Serial No. 445,498.

*To all whom it may concern:*

Be it known that I, JOHN C. COLE, a citizen of the United States of America, residing at Chicopee Falls, in the county of Hampden and State of Massachusetts, have invented new and useful Improvements in Removable Tubular Rims, of which the following is a specification.

This invention relates to improvements in the construction of so-called "demountable" rims for vehicle wheels such as are used on self-propelled vehicles equipped with pneumatic tires. By the term "demountable" as used herein, is meant a rim adapted to receive a tire ready for use, which rim may be quickly applied to, or removed from, a rim fixed on the wheel, the demountable rim being secured to the fixed rim by the use of various devices for locking it thereto in operative position.

The invention embodied in this application is in the nature of an improvement on the construction shown, described, and claimed in my prior Letters Patent of the United States dated February 8, 1910 and numbered 948,813 for "improvements in removable wheel rims," in which patent is embodied a certain type of locking device adapted to coöperate with a fixed and a removable rim, both of said rims being shown and described as of solid metal construction.

The present invention has for its object the improvement in the construction of the rims and the coöperative locking devices, whereby a much lighter structure is obtained without any sacrifice of necessary strength and rigidity; the fixed rim and the removable rim of said patented construction being in the present invention made tubular, whereby the desired lightness, strength, and rigidity are attained.

Reference to the specification and accompanying drawings will fully disclose the nature and construction of the invention.

In the drawings forming part of this application,—Figure 1 is a transverse, sectional elevation showing the wooden felly of the wheel and the improved tubular fixed rim on the felly and the improved tubular demountable rim on the fixed rim, together with the devices for securing the demountable rim in position, the plane of the section being on line 1—1, Fig. 3. This view shows the removable rim adapted to receive what is known as the bolted on, or Fisk type of tire. Fig. 2 is a similar sectional view but showing a demountable rim adapted to receive what is known as the clencher type of tire, all of the elements of the structure being the same as in Fig. 1, except that the cross sectional form of the demountable rim is somewhat changed to adapt it to the clencher type of tire. Fig. 3 is a side elevation of the complete wheel showing the demountable rim in position thereon. Fig. 4 is a cross sectional view of the demountable rim shown in Fig. 2 but showing the same provided with a filling ring of wood instead of being closed by a metal ring as shown in Fig. 2.

Referring to the drawings, *a* designates the usual wooden felly of the wheel; *b* designates the fixed tubular rim permanently secured to the felly and which consists of a vertical side portion *c*, an inclined portion *d* and the flat portion *e* which fits closely the periphery of the felly to which it is secured in any desired way. This rim *b* is formed from a single piece of metal, the parts thereof just described being so disposed as to leave it open around the outer periphery thereof, this open space being closed by means of an annular band *f* which is secured to the tubular rim *b* by crimping, rolling, or shrinking it thereon. One side of this band *f* (indicated by *g*) is rolled down over the inclined side *d* of the rim extending down to the edge of the felly, as shown at *h*, and it is also bent or rolled down over the free edge of said side portion *d* of the rim, as indicated at *i*, and between this point and the opposite straight side of the rim (indicated by *c*) a circumferential channel *j* is formed in the band *f*, a shoulder *k* being formed on that part of the band *f* contiguous to the inner surface of the side *c*, which shoulder serves as a support for one side of the demountable tubular rim, the band *f* from this shoulder extending up and being rolled over the outer edge of the side *c* and down onto the outside of the latter, as shown at *m*. In this manner the band *f* (which is an endless, annular piece) serves to close the open part of the rim and to brace the two borders thereof, and when this band is put on hot, in the manner described, the contraction thereof, when cooling, makes a very rigid structure in connection with the tubular rim on which it is mounted.

As stated, Fig. 1 shows a bolted on type of tire which requires a flat base. Therefore the tubular rim in this instance comprises the channel-shaped body part of the rim, indicated by $m$ provided with two flat, rectangularly disposed portions $o$ and $p$, which constitute the sides of the rim, with which the annular band $q$ is interlocked, by crimping or rolling the edges $r$ and $s$ over the edge of the two sides $o$ and $p$. The base of the tire (which is circumferentially divided) is indicated by $t$ and $u$,—$v$ indicating a portion of the tire proper. To secure this type of a tire to the removable rim, a bolt $w$ is provided which extends through the base of the tire as shown, and the head $x$ of the bolt on the one side and the washer $y$ on the other, engage respectively the borders of the demountable rim and the border of two clamping rings 2 and 3 which fit over the base of the tire. To secure the demountable rim to the fixed rim after it has been brought to a seat on the shoulder $k$ of the latter, the split locking-ring 4 is provided, which ring has an inclined face fitting the surface of the part $g$ of the fixed rim, and by means of a number of bolts $4^1$ which extend through this ring, and through the fixed rim, the ring may be drawn up against the inclined surface of the rim and expanded thereby into contact with the under side of the demountable rim, as at 6, Fig. 1, the locking ring preferably being formed with a lip or upstanding border 7 whereby the demountable rim may be securely held in place. To remove the demountable rim and its tire it is only necessary, as set forth in my above referred to prior patent, to remove the nuts 9 from the bolts $4^1$ which will permit the ring 4 to contract in diameter sufficiently to permit the demountable rim to be drawn over the lip 7 of the locking ring; the locking devices, however, form no part of this invention.

In the modification shown in Fig. 2, the demountable rim 10 is provided with outwardly extending side portions 11 and 12, and the inwardly extending hook-shaped portions 13 and 14 for use when the clencher type of tire is used. Riveted to the rim 10 is an inverted U-shaped element 15 by means of the rivet 16. The element 15, together with the side portions 11 and 12 form bearing supports for the tire when in place.

Referring to the structure shown in Fig. 4, 17 designates a filling or ring of wood instead of the channel-shaped ring shown in Fig. 2. It is of course understood that the rim 10 is secured to and detached from the tubular wheel rim $b$ in the same manner as that shown and described in connection with Fig. 1. By the term "tubular rim," it is to be understood that the parts $b$ and $f$ are permanently secured together and serve as a single element to which the tire-supporting parts are locked or secured by means of the ring 4, as described.

What I claim, is:—

A vehicle wheel, and a tubular rim fixed to the felly thereof comprising one side parallel with the plane of the wheel, the opposite side being disposed at an acute angle to said plane, and an annular band secured over said inclined side, and over the outer edge of said first-named side, there being a seat thereon for a demountable rim, together with an expansible ring bearing on said inclined side of the fixed rim, and means to force said ring against said side into locking engagement with the underside of a demountable rim mounted on the fixed rim.

JOHN CLARENCE COLE.

Witnesses:
K. I. CLEMONS,
HARRY W. BOWEN.